United States Patent
Matsubara et al.

(10) Patent No.: US 10,654,970 B2
(45) Date of Patent: May 19, 2020

(54) CAMERA MODULE-USE LIQUID CRYSTALLINE POLYESTER RESIN COMPOSITION AND CAMERA MODULE-USE MOLDED PRODUCT FORMED THEREOF

(71) Applicant: Toray Industries, Inc., Tokyo (JP)

(72) Inventors: Satoshi Matsubara, Nagoya (JP); Takeshi Shimada, Nagoya (JP); Koji Tachikawa, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 120 days.

(21) Appl. No.: 15/771,270

(22) PCT Filed: Oct. 17, 2016

(86) PCT No.: PCT/JP2016/080669
§ 371 (c)(1),
(2) Date: Apr. 26, 2018

(87) PCT Pub. No.: WO2017/073387
PCT Pub. Date: May 4, 2017

(65) Prior Publication Data
US 2018/0334534 A1    Nov. 22, 2018

(30) Foreign Application Priority Data

Oct. 30, 2015  (JP) ................. 2015-214364

(51) Int. Cl.
| | | |
|---|---|---|
| C08L 67/03 | (2006.01) | |
| C08L 67/02 | (2006.01) | |
| C08K 3/36 | (2006.01) | |
| C08G 63/60 | (2006.01) | |
| C08L 67/00 | (2006.01) | |
| C09K 19/38 | (2006.01) | |
| C08K 7/00 | (2006.01) | |
| C08K 3/34 | (2006.01) | |
| C08K 3/40 | (2006.01) | |
| C08K 7/18 | (2006.01) | |
| G02B 7/02 | (2006.01) | |
| C09K 19/52 | (2006.01) | |
| C08K 7/14 | (2006.01) | |

(52) U.S. Cl.
CPC .......... *C08G 63/605* (2013.01); *C08G 63/60* (2013.01); *C08K 3/34* (2013.01); *C08K 3/40* (2013.01); *C08K 7/00* (2013.01); *C08K 7/18* (2013.01); *C08L 67/00* (2013.01); *C09K 19/3809* (2013.01); *C08K 3/346* (2013.01); *C08K 3/36* (2013.01); *C08K 7/14* (2013.01); *C08K 2003/343* (2013.01); *C08K 2201/003* (2013.01); *C08K 2201/004* (2013.01); *C08K 2201/005* (2013.01); *C09K 2019/521* (2013.01); *G02B 7/02* (2013.01)

(58) Field of Classification Search
CPC .................. C08L 67/06; C08K 3/36
See application file for complete search history.

(56) References Cited

U.S. PATENT DOCUMENTS

| | | | | |
|---|---|---|---|---|
| 8,658,057 | B2* | 2/2014 | Nakayama | ............. B29C 45/00 252/299.01 |
| 2012/0135228 | A1* | 5/2012 | Fukuhara | ................ C08L 67/00 428/339 |
| 2012/0232188 | A1* | 9/2012 | Nakayama | .......... B29C 45/0001 523/219 |
| 2013/0253118 | A1* | 9/2013 | Shiraishi | .................. C08K 3/04 524/423 |
| 2015/0038631 | A1* | 2/2015 | Hamaguchi | .............. C08J 3/203 524/449 |
| 2016/0177211 | A1* | 6/2016 | Komatsu | ................ C08L 67/03 508/116 |

FOREIGN PATENT DOCUMENTS

| | | |
|---|---|---|
| JP | 2000-080289 A | 3/2000 |
| JP | 2006-299254 A | 11/2006 |
| JP | 2007-138143 A | 6/2007 |
| JP | 2010-106165 A | 5/2010 |
| JP | 2011-068831 A | 4/2011 |

\* cited by examiner

*Primary Examiner* — Rip A Lee
(74) *Attorney, Agent, or Firm* — DLA Piper LLP (US)

(57) ABSTRACT

A liquid crystalline polyester resin composition for use in camera modules includes 20 to 45 parts by weight of spherical silica particles (B) having an average particle diameter of 15 μm or more and less than 30 μm in 100 parts by weight of a liquid crystalline polyester resin (A). A polyamide resin composition with which a camera module exhibiting excellent low dust forming property, toughness and impact strength can be obtained.

6 Claims, No Drawings

CAMERA MODULE-USE LIQUID CRYSTALLINE POLYESTER RESIN COMPOSITION AND CAMERA MODULE-USE MOLDED PRODUCT FORMED THEREOF

TECHNICAL FIELD

This disclosure relates to a liquid crystalline polyester resin composition for use in camera modules exhibiting excellent low dust forming property, toughness and impact strength, and a molded product made therefrom for use in the camera modules.

BACKGROUND

Recently, improved performance is increasingly required for plastics and thus a number of resins of various new abilities have been developed and marketed. Among them, much attention is centered on optically anisotropic liquid crystalline resins characterized by the parallel arrangement of molecular chains because of their excellent fluidity, heat resistance, mechanical properties and dimensional stability, and they are increasingly used in precision molded products such as micro connectors.

Particularly in components such as camera modules, for holding optical lenses, there is a need for further miniaturization and improvement of overall accuracy by exploiting the dimensional stability and fluidity of a liquid crystalline resin composition, which is studied much (for example, Japanese Unexamined Patent Application Publication No. 2010-106165). In JP '165, blending silica particles having an average particle diameter of not more than 5 μm with a liquid crystalline polyester resin prevents dust formation due to fibrillation on the surface of a component such as a camera module, comprising a lens holding element and made from the liquid crystalline polyester resin that may occur while the component is dusted off by ultrasonic cleaning.

Recently, driving mechanisms for zooming, focusing, anti-shake image stabilization and the like are increasingly provided to camera module components, and elements of the driving mechanisms may slide together or crash together with a certain impact. Dust formation due to desorption of particles from the surface of the elements, which is caused by the sliding motion and/or the crash with a certain impact, is emerging as a problem. However, dust formation is not sufficiently controlled with the method described in JP '165. Moreover, in some cases the resin has been replaced by a tougher resin allowing smoother sliding motion and providing high impact resistance such as nylon resins to solve the problem of dust formation due to desorption of particles from the surface of the elements, but nylon resins have had a problem of large dimensional changes caused by water absorption. It could therefore be helpful to provide a liquid crystalline resin composition for use in camera modules exhibiting excellent low dust forming property, toughness and impact strength, and a molded product made therefrom for use in the camera modules.

SUMMARY

We found that a liquid crystalline resin composition for use in camera modules exhibiting excellent low dust forming property, toughness and impact strength can be obtained by blending a particular amount of spherical silica particles having a particular particle diameter into a liquid crystalline polyester resin.

We thus provide:

A liquid crystalline polyester resin composition for use in camera modules, the resin composition comprising 20 to 45 parts by weight of spherical silica particles (B) having an average particle diameter of 15 μm or more and less than 30 μm in 100 parts by weight of a liquid crystalline polyester resin (A).

A molded product for use in camera modules, the molded product comprising the above-described liquid crystalline polyester resin composition for use in camera modules.

A camera module, the camera module comprising the above-described molded product for use in camera modules.

According to the liquid crystalline polyester resin composition, a liquid crystalline resin composition for use in camera modules exhibiting excellent low dust forming property, toughness and impact strength, and a molded product made therefrom for use in the camera modules can be obtained. The molded product for use in the camera modules can be suitably used in camera module components.

DETAILED DESCRIPTION

Our compositions and molded products will be described in detail below.

The liquid crystalline polyester resin composition for use in camera modules comprises 20 to 45 parts by weight of spherical silica particles (B), which have an average particle diameter of 15 μm or more and less than 30 μm, relative to 100 parts by weight of a liquid crystalline polyester resin (A).

The liquid crystalline polyester resin (A) is a liquid crystalline polyester resin composed of a structural unit selected from, for example, aromatic oxycarbonyl unit, aromatic and/or aliphatic dioxy unit, aromatic and/or aliphatic dicarbonyl unit, and the like, and being capable of forming an anisotropic molten phase.

Examples of the aromatic oxycarbonyl unit include the structural units derived from p-hydroxybenzoic acid, 6-hydroxy-2-naphthoic acid and the like, and the structural unit derived from p-hydroxybenzoic acid is preferable. Examples of the aromatic and/or aliphatic dioxy unit include the structural units derived from 4,4'-dihydroxybiphenyl, hydroquinone, 3,3',5,5'-tetramethyl-4,4'-dihydroxybiphenyl, t-butylhydroquinone, phenylhydroquinone, 2,6-dihydroxynaphthalene, 2,7-dihydroxynaphthalene, 2,2-bis(4-hydroxyphenyl)propane, 4,4'-dihydroxydiphenyl ether, ethylene glycol, 1,3-propylene glycol, 1,4-butanediol and the like, and the structural units derived from 4,4'-dihydroxybiphenyl and hydroquinone are preferable. Examples of the aromatic and/or aliphatic dicarbonyl unit include the structural units derived from terephthalic acid, isophthalic acid, 2,6-naphthalenedicarboxylic acid, 4,4'-diphenyldicarboxylic acid, 1,2-bis(phenoxy)ethane-4,4'-dicarboxylic acid, 1,2-bis(2-chlorophenoxy)ethane-4,4'-dicarboxylic acid, 4,4'-dicarboxydiphenyl ether, adipic acid, sebacic acid and the like, and the structural units derived from terephthalic acid and isophthalic acid are preferable.

Specific examples of the liquid crystalline polyester resin include: liquid crystalline polyester resins composed of the structural units derived from p-hydroxybenzoic acid and 6-hydroxy-2-naphthoic acid; liquid crystalline polyester resins composed of the structural unit derived from p-hydroxybenzoic acid, the structural unit derived from 6-hydroxy-2-naphthoic acid, the structural unit derived from an aromatic dihydroxy compound, and the structural unit derived from an aromatic dicarboxylic acid and/or an aliphatic dicarboxylic acid; liquid crystalline polyester resins composed of the structural unit derived from p-hydroxybenzoic acid, the structural unit derived from 4,4'-dihydroxybiphenyl, and the structural unit derived from an aromatic dicarboxylic acid such as terephthalic acid or isophthalic acid, and/or an aliphatic dicarboxylic acid such as adipic acid or sebacic acid; liquid crystalline polyester resins composed of the structural unit derived from p-hydroxybenzoic acid, the structural unit derived from 4,4'-dihydroxybiphenyl, the structural unit derived from hydroquinone, and the structural unit derived from an aromatic dicarboxylic acid such as terephthalic acid or isophthalic acid, and/or an aliphatic dicarboxylic acid such as adipic acid or sebacic acid; liquid crystalline polyester resins composed of the structural unit derived from p-hydroxybenzoic acid, the structural unit derived from ethylene glycol, and the structural unit derived from terephthalic acid and/or isophthalic acid; liquid crystalline polyester resins composed of the structural unit derived from p-hydroxybenzoic acid, the structural unit derived from ethylene glycol, the structural unit derived from 4,4'-dihydroxybiphenyl, and the structural unit derived from terephthalic acid and/or an aliphatic dicarboxylic acid, such as adipic acid or sebacic acid; liquid crystalline polyester resins composed of the structural unit derived from p-hydroxybenzoic acid, the structural unit derived from ethylene glycol, the structural unit derived from an aromatic dihydroxy compound, and the structural unit derived from an aromatic dicarboxylic acid such as terephthalic acid, isophthalic acid, or 2,6-naphthalenedicarboxylic acid; liquid crystalline polyester resins composed of the structural unit derived from 6-hydroxy-2-naphthoic acid, the structural unit derived from 4,4'-dihydroxybiphenyl, and the structural unit derived from 2,6-naphthalenedicarboxylic acid and the like.

Among those liquid crystalline polyester resins, a liquid crystalline polyester resin composed of the structural units (I), (II), (III), (IV) and (V) below is preferable in terms of low dust forming property. Such a liquid crystalline polyester resin is preferable because of its reduced liquid crystallinity and the resulting decreased incidence of fibrillation due to the large number of copolymerization units.

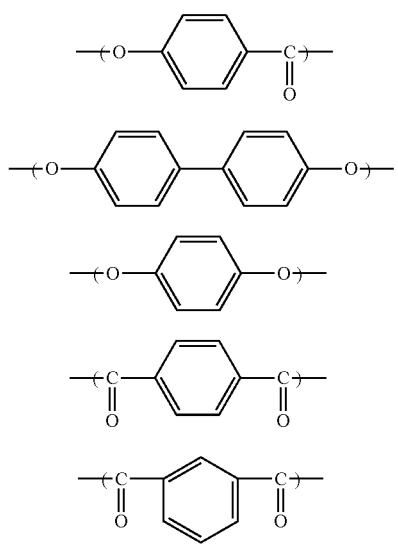

The above structural units (I), (II), (III), (IV) and (V) represent the structural unit derived from p-hydroxybenzoic acid, the structural unit derived from 4,4'-dihydroxybiphenyl, the structural unit derived from hydroquinone, the structural unit derived from terephthalic acid, and the structural unit derived from isophthalic acid, respectively.

The content of the structural unit (I) is preferably from 65 to 80% by mole relative to the total content of the structural units (I), (II) and (III). The lower limit value is more preferably not less than 68% by mole because it leads to a reduced gas production, whereas the upper limit value is more preferably not more than 78% by mole in terms of toughness.

Moreover, the content of the structural unit (II) is preferably from 55 to 85% by mole relative to the total content of the structural units (II) and (III). Particularly, the lower limit value is more preferably not less than 55% by mole and most preferably 58% by mole because it leads to a reduced gas production, whereas the upper limit value is more preferably not more than 78% by mole and most preferably not more than 73% by mole in terms of toughness.

Moreover, the content of the structural unit (IV) is preferably from 50 to 95% by mole relative to the total content of the structural units (IV) and (V). Particularly, the lower limit value is more preferably not less than 55% by mole and most preferably 60% by mole because it leads to a reduced gas production, whereas the upper limit value is more preferably not more than 90% by mole and most preferably not more than 85% by mole in terms of toughness.

Preferably, the total content of the structural units (II) and (III) is substantially equimolar to the total content of the structural units (IV) and (V). The phrase "substantially equimolar" indicates that the structural units forming the main polymer chain, excluding the ends, are in equimolar amounts, while the structural units in the main polymer chain including the ends are not necessarily in equimolar amounts. A dicarboxylic acid component or a dihydroxy component may be added in excess for the purpose of adjusting the terminal groups of the polymer.

The content of each structural unit in the liquid crystalline polyester resin (A) can be calculated according to the process as described below. That is, a certain amount of a liquid crystalline polyester resin is weighed and transferred into a NMR (nuclear magnetic resonance) tube, and dissolved in a solvent in which the liquid crystalline polyester resin can be dissolved (for example, a mixed solvent of pentafluorophenol/tetrachloroethane-$d_2$), and measured by $^1$H-NMR spectroscopy. The content of each structural unit can be calculated based on the peak area ratio among the respective structural units.

The melting point of the liquid crystalline polyester resin is preferably 300 to 350° C. in terms of processability and fluidity. The lower limit value is more preferably not lower than 310° C., and particularly preferably not lower than 320° C., in terms of processability. Moreover, the upper limit value is more preferably not higher than 340° C., and particularly preferably not higher than 330° C., in terms of fluidity. The liquid crystalline polyester resin having such a melting point is preferable because it will allow the generation of decomposition gas to be suppressed and the fluidity to be fully expressed during processing.

The melting point (Tm) of the liquid crystalline polyester resin (A) can be measured by the following method. In the differential calorimetry analysis, the liquid crystalline polyester resin is heated at a rate of 40° C./min under increasing temperature conditions to measure the endothermic peak temperature ($Tm_1$) and, after the observation of $Tm_1$, the temperature is held constant at $Tm_1+20°$ C. for five minutes. Subsequently, the resin is once cooled down to room temperature at a rate of 20° C./min under decreasing temperature conditions and then heated again at a rate of 20° C./min under increasing temperature conditions to measure the endothermic peak temperature ($Tm_2$). The melting point (Tm) of the resin is determined from the value of the observed $Tm_2$.

Moreover, the melt viscosity of the liquid crystalline polyester resin is preferably 1 to 100 Pa·s. The lower limit value is more preferably not less than 3 Pa·s and particularly preferably not less than 5 Pa·s in terms of processability, while the upper limit value is more preferably not more than 50 Pa·s and particularly preferably not more than 30 Pa·s in terms of fluidity. The melt viscosity is a value measured with a KOKA-type flow tester under conditions including a temperature of the melting point of the liquid crystalline polyester resin+10° C. and a shear rate of 1,000/s.

The liquid crystalline polyester resin (A) can be obtained by a known polycondensation method for the synthesis of polyester. Examples of the method preferably include the following manufacturing methods:
(1) a method of synthesizing a liquid crystalline polyester through deacetylating polycondensation of p-acetoxybenzoic acid, and 4,4'-diacetoxybiphenyl or diacetoxybenzene, and terephthalic acid or isophthalic acid;
(2) a method of synthesizing a liquid crystalline polyester through acylation of phenolic hydroxyl groups and subsequent deacetylating polycondensation by reaction of p-hydroxybenzoic acid, and 4,4'-dihydroxybiphenyl or hydroquinone, and terephthalic acid or isophthalic acid with acetic anhydride;
(3) a method of synthesizing a liquid crystalline polyester through phenol-removing polycondensation of a phenyl ester of p-hydroxybenzoic acid, and 4,4'-dihydroxybiphenyl or hydroquinone, and a diphenyl ester of terephthalic acid or isophthalic acid; and
(4) a method of synthesizing a liquid crystalline polyester through formation of a diphenyl ester by reaction of p-hydroxybenzoic acid and an aromatic dicarboxylic acid such as terephthalic acid or isophthalic acid with a predetermined amount of a diphenyl carbonate, and through subsequent phenol-removing polycondensation by addition of an aromatic dihydroxy compound such as 4,4'-dihydroxybiphenyl or hydroquinone.

When a liquid crystalline polyester resin is produced through deacetylating polycondensation, a melt polymerization method is preferable, in which the polycondensation is completed by allowing the reaction to proceed under reduced pressure at a temperature enough to melt the liquid crystalline polyester resin. An exemplary method comprises placing predetermined amounts of p-hydroxybenzoic acid, 4,4'-dihydroxybiphenyl, hydroquinone, terephthalic acid, isophthalic acid, and acetic anhydride in a reaction vessel equipped with a mixing impeller and a distillation tube and with a discharge port in the lower part, heating the mixture with stirring under nitrogen gas atmosphere for acetylation of hydroxyl groups, and subsequently increasing temperature to the melting temperature of the liquid crystalline polyester resin for polycondensation under reduced pressure and completing the reaction.

A pressure of, for example, about 1.0 kg/cm² (0.1 MPa) is applied inside the reaction vessel at the melting temperature of the obtained polymer to allow it to be discharged in the form of a strand from a discharge port arranged in the lower part of the reaction vessel. The melt polymerization method is an advantageous method of producing homogeneous polymers and is preferable because it allows the obtainment of excellent polymers which will produce a less amount of gas.

The polycondensation reaction for the synthesis of a liquid crystalline polyester resin can proceed without any catalyst and, however, a metal compound, such as stannous acetate, tetrabutyl titanate, potassium acetate, sodium acetate, antimony trioxide, and metal magnesium, may be used in the reaction.

The spherical silica (B) refers to primary spherical particles of silica having a sphericity of not less than 0.60. The sphericity is preferably not less than 0.85, more preferably not less than 0.90, and further preferably not less than 0.92 in terms of high density packaging in resins and of dispersibility.

The sphericity is calculated from the area and circumferential length of a particle obtained based on its two-dimensional image, as a value calculated by the formula: (sphericity)=$\{4\pi\times(area)/(circumferential\ length)^2\}$. A particle with sphericity close to 1 has a more spherical shape. Measurement of the sphericity can be carried out by weighing 100 mg of silica particles and dispersing them in water, measuring the area and the circumferential length based on the two-dimensional images of randomly selected 1000 particles using an image analyzer (FPIA-3000; Sysmex Co.), and applying the average values to the above formula.

The average particle diameter of the spherical silica (B) is essentially 15 μm or more and less than 30 μm to express the advantageous effects of the present invention, that is, the low dust formation, toughness and impact strength. When a molded product is produced using a resin composition containing the spherical silica (B) having an average particle diameter of 15 μm or more and less than 30 μm, the low dust formation effect specific to the resin composition can be obtained, as indicated by that the liquid crystalline polyester resin is allowed by the spherical silica (B) to form a skin layer with reduced orientation and to produce a molded product with a less rough surface. The average particle diameter of the spherical silica (B) is preferably not less than 15 μm and not more than 25 μm, and more preferably not less than 15 μm and not more than 20 μm, in terms of the surface smoothness of the molded product and of the dispersibility of the spherical silica particles in the resin. When the average particle diameter is less than 15 μm, the reduction effect on the orientation of the liquid crystalline polyester resin is insufficient and, thus, the low dust formation effect based on decreased incidence of fibrillation is not acquired. Moreover, when the average particle diameter is not less than 30 μm, the surface smoothness is significantly reduced and surface roughness is generated by uneven shrinkage, which results in increased dust formation caused by sliding motion.

The average particle diameter as used herein refers to number-average particle diameter, which can be determined with a laser diffraction/scattering particle size analyzer.

The spherical silica particles do not change the shape and the average particle diameter between before and after the melt-kneading into the resin composition. Therefore, it may be understood that the spherical silica is contained in the resin composition, while retaining the shape and the average particle diameter identical to those properties as measured before kneading into the resin composition.

The content of the spherical silica (B) is essentially 20 to 45 parts by weight to express the advantageous effects, that is, the low dust formation, toughness and impact strength, and is preferably not less than 25 parts by weight in terms of high toughness and not more than 35 parts by weight in terms of low dust forming property, relative to 100 parts by weight of the liquid crystalline polyester resin (A). When the content is less than 20 parts by weight, the reduction effect of the spherical silica on fibrillation of the liquid crystalline resin is insufficient and, thus, the low dust forming property is not acquired. Moreover, when the content is more than 45 parts by weight, the number of spherical silica particles desorbed from the resin is undesirably increased and, thus, dust formation is enhanced. Moreover, the melt viscosity is also increased and, thus, the fluidity of the liquid crystalline polyester resin is compromised. The content is most preferably 25 to 35 parts by weight to establish both low dust forming property and high toughness.

The method of manufacturing the spherical silica (B) is not particularly limited, but a melting process in which crushed crystal silica is melted and spherical silica is formed by surface tension is preferable. The method is preferable because it allows the production of spherical silica particles having a particle diameter with which a liquid crystalline polyester resin can be blended to specifically express the desired effects, namely, the low dust forming property, toughness and impact strength. Examples of commercially available spherical silica products which are produced by the melting process include "FEB75A" (Admatechs Co., Ltd.), "FB-950" (Denka Co., Ltd.), and the like.

The liquid crystalline polyester resin composition for use in camera modules may contain a fibrous filler or any type (plate-like, granular, spherical (excluding spherical silica), or hollow spherical type), excepting fibrous type, of fillers to the extent that the desired effect is not impaired, and preferably contains a plate-like filler (C) having an average particle diameter of 10 to 50 μm and/or a fibrous filler (D) having an average fiber length of 30 to 300 μm.

As the plate-like filler (C), an inorganic plate-like filler such as mica, talc, graphite, or clay, may be used, and talc and mica are preferable, and mica is particularly preferable because it increases the surface smoothness and the surface hardness.

The average particle diameter of the plate-like filler (C) is preferably 10 to 50 μm. The lower limit value is preferably not less than 15 μm and further preferably not less than 20 μm in terms of dispersibility. The upper limit value is preferably not more than 45 μm, further preferably not more than 40 μm, and particularly preferably not more than 30 μm, in terms of the surface smoothness of the composition. Among those, 20 to 30 μm is preferable because it allows uniform distribution of the plate-like filler in the resin composition and thus the surface smoothness is particularly increased.

The average particle diameter of the plate-like filler (C) represents a number-average particle diameter. The number-average particle diameter can be obtained, for example, by observing ashes from incineration of the resin composition under scanning electron microscope, and measuring the major axis of the cross-section in randomly selected 50 plate-like filler particles.

As the fibrous filler (D), glass fiber, carbon fiber, aromatic polyamide fiber, potassium titanate fiber, gypsum fiber, brass fiber, stainless steel fiber, steel fiber, ceramic fiber, boron-whisker fiber, asbestos fiber, wollastonite, titanium oxide fiber, calcium carbonate fiber, basalt fiber, or the like may be used, and glass fiber and wollastonite are preferable, and glass fiber is particularly preferable because it increases the impact strength.

The average fiber length of the fibrous filler (D) is preferably 30 to 300 μm. The average fiber length is preferably not more than 300 μm because, when the fiber length is more than 300 μm, a concern about dust formation due to desorption of the fiber is increased. The lower limit value is more preferably not less than 35 μm and further preferably not less than 40 μm in terms of impact strength. The upper limit value is preferably not more than 150 μm and further preferably not more than 80 μm in terms of low dust forming property.

The average fiber length of the fibrous filler (D) represents a number-average fiber length. The number-average fiber length can be obtained, for example, by observing ashes from incineration of the resin composition under light microscope, and measuring the fiber length in randomly selected 500 fibrous filler fibers.

The plate-like filler (C) and the fibrous filler (D) may be used together.

The content of the plate-like filler (C) and/or fibrous filler (D) is preferably 1 to 25 parts by weight relative to 100 parts by weight of the liquid crystalline polyester resin (A). The lower limit value is more preferably not less than 2 parts by weight and further preferably not less than 3 parts by weight in terms of impact strength. The upper limit value is more preferably not more than 15 parts by weight and further preferably not more than 10 parts by weight in terms of dust forming property.

Furthermore, specified properties may be provided by adding conventional additives such as antioxidants and heat stabilizer (for example, hindered phenols, hydroquinone, phosphites, and substitution products thereof and the like), ultraviolet absorbers (for example, resorcinol, salicylates, benzotriazole, benzophenone and the like), release agents (montanic acid, and salts, esters and half esters thereof; stearyl alcohol, stearamide, and polyethylene wax and the like), coloring agents including dyes (for example, nigrosin and the like) and pigments (for example, cadmium sulfide, phthalocyanine, carbon black and the like), plasticizers, flame retardants, flame retardant promoters, and anti-static agents, and/or other thermoplastic resins (fluororesins and the like) to the extent that the desired effect is not impaired.

The liquid crystalline polyester resin composition for use in camera modules is preferably produced by melt-kneading and a known melt-kneading method can be used for that purpose. For example, a Banbury mixer, rubber roller, kneader, single or twin screw extruder, or the like can be used. Among them, preferably an extruder, more preferably a twin screw extruder, and particularly preferably a twin screw extruder having an intermediate addition port is used because the number-average length of fibrous fillers should be controlled in the liquid crystalline polyester resin composition. However, any metal salt of a higher fatty acid is preferably blended with pellets processed through melt-kneading and extrusion. Blending the metal salt can dramatically increase the molding processability. For example, a tumbler mixer, ribbon blender, or the like is used to blend the pellets with the metal salt of a higher fatty acid. Moreover, the metal salt of a higher fatty acid may be processed together with the liquid crystalline resin and other additives through melt-kneading in a twin screw extruder.

The liquid crystalline polyester resin composition for use in camera modules is molded into various molded products by a known molding method, and preferably by injection molding. Injection molding of the liquid crystalline polyester resin allows formation of a skin layer with reduced orientation and of a less rough surface due to the presence of the spherical silica having a particular particle diameter and blended in a particular amount, and the production of some specific effect in low dust forming property.

The thus obtained molded products exhibit excellent low dust forming property, toughness and impact strength, and therefore can be suitably used in optical instrument components, further suitably used in components comprising lens holding elements, and particularly suitably used in camera modules.

EXAMPLES

Our compositions and molded products will be described in detail by way of examples below. However, this disclosure is not limited only to the examples below.

Evaluation methods for the respective properties are as described below.

(1) Composition Analysis of a Liquid Crystalline Polyester Resin

Composition analysis of a liquid crystalline polyester resin was carried out by measurement of a $^1$H-nuclear magnetic resonance ($^1$H-NMR) spectrum. An amount of 50 mg of the liquid crystalline polyester resin was weighed and transferred into a NMR tube, and dissolved in 800 μL of a solvent (a mixed solvent of pentafluorophenol/1,1,2,2-tetrachloroethane-d$_2$ at a ratio (by weight) of 65/35). The $^1$H-NMR spectrum of the liquid crystalline polyester resin was measured using the UNITY INOVA type-500 NMR instrument (manufactured by Varian Medical Systems, Inc.) at a temperature of 80° C. with an observation frequency of 500 MHz, and the composition was analyzed based on the peak area ratio among the respective structural units corresponding to the peaks observed in the range of around 7 to 9.5 ppm.

(2) Measurement of the Melting Point of a Liquid Crystalline Polyester Resin

In the differential scanning calorimetry for the determination of Tm (melting point), a liquid crystalline polyester resin or liquid crystalline polyester resin composition was heated at a rate of 40° C./min under increasing temperature conditions to measure the endothermic peak temperature (Tm$_1$) and, after the observation of Tm$_1$, the temperature was held constant at Tm$_1$+20° C. for five minutes. Subsequently, the resin was once cooled down to room temperature at a rate of 20° C./min under decreasing temperature conditions and then heated again at a rate of 20° C./min under increasing temperature conditions to measure the endothermic peak temperature (Tm$_2$). The melting point (Tm) of the resin was determined from the value of the observed Tm$_2$.

(3) Number-Average Particle Diameter of Silica Particles

The number-average particle diameter of silica particles was determined by weighing 100 mg of silica particles and dispersing them in water, and measuring them using a laser diffraction/scattering particle size analyzer (LA-300, manufactured by HORIBA, Ltd.).

(4) Sphericity of Silica Particles

In the measurement of sphericity, the sphericity was calculated from the area and circumferential length of a particle obtained based on its two-dimensional image, as a value calculated by the formula: (sphericity)=$\{4\pi\times(\text{area})/(\text{circumferential length})^2\}$. The sphericity was measured by weighing 100 mg of silica particles and dispersing them in water, measuring the area and the circumferential length based on the two-dimensional images of randomly selected 1000 particles using an image analyzer (FPIA-3000; Sysmex Co.), and applying the average values to the above formula.

(5) Number-Average Particle Diameter of Plate-Like Fillers

The number-average particle diameter was obtained by observing ashes from incineration of a liquid crystalline polyester resin composition under scanning electron microscope, and measuring the major axis of the cross-section in randomly selected 50 plate-like filler particles.

(6) Number-Average Fiber Length of Fibrous Fillers

The number-average fiber length was obtained by observing ashes from incineration of a liquid crystalline polyester resin composition under light microscope, and measuring the fiber length in randomly selected 500 fibrous filler fibers.

(7) Dust Forming Property

A liquid crystalline polyester resin composition was molded using the FANUC ROBOSHOT α-30C (manufactured by FANUC Co.) into an ASTM Type 1 dumbbell-shaped test specimen. For molding, the cylinder temperature was set to the melting point (Tm) of the liquid crystalline polyester resin composition+10° C., while the mold temperature was set to 90° C. A piece of Scotch transparent adhesive tape manufactured by Sumitomo 3M Ltd. was pressed and adhered to the molded product obtained as described above, and then removed to measure the haze value (cloudiness) on a direct-reading haze meter manufactured by Toyo Seiki Seisaku-sho, Ltd. A smaller haze value indicates less cloudiness.

(8) Izod Impact Strength

Injection molding was carried out using the FANUC ROBOSHOT α-30C (manufactured by FANUC Co.) under conditions including the cylinder temperature set at the melting point of a liquid crystalline polyester+10° C. and the mold temperature set at 90° C. to produce ASTM impact test specimens. The Izod impact strength of notched specimens was measured according to ASTM D256 and the average value was calculated from ten readings.

(9) Toughness

Injection molding was carried out using the FANUC ROBOSHOT α-30C (manufactured by FANUC Co.) under conditions including the cylinder temperature set at the melting point of a liquid crystalline polyester+10° C. and the mold temperature set at 90° C. to produce ASTM bend test specimens (test strips), which were used according to ASTM D648 for the measurement.

(A) Liquid Crystalline Polyester Resins

Reference Example 1: Synthesis of the Liquid Crystalline Polyester Resin (A-1)

In a 5-L reaction vessel equipped with a mixing impeller and a distillation tube, 870 g of p-hydroxybenzoic acid (6.30 mol), 327 g of 4,4'-dihydroxybiphenyl (1.89 mol), 89 g of hydroquinone (0.81 mol), 292 g of terephthalic acid (1.76 mol), 157 g of isophthalic acid (0.95 mol), and 1367 g of acetic anhydride (1.03 equivalents of the total phenolic hydroxyl groups) were placed, and the resulting mixture was allowed to react for two hours with stirring at 145° C. under nitrogen gas atmosphere and then heated to 320° C. for four hours. Subsequently, the polymerization temperature was maintained at 320° C. while reducing the pressure to 1.0 mmHg (133 Pa) for 1.0 hour, and the reaction was allowed to continue for an additional 90 minutes, and the polycondensation was not completed until the torque reached 15 kg·cm. Then, the pressure within the reaction vessel was increased to 1.0 kg/cm$^2$ (0.1 MPa) to discharge the polymer in the form of a strand through a mouthpiece with one circular discharge port having a diameter of 10 mm, and the polymer pelletized with a cutter was obtained as the liquid crystalline polyester resin (A-1).

The liquid crystalline polyester resin (A-1) is composed of the units represented by the structural formulae (I), (II), (III), (IV) and (V), and is composed of the unit represented by the structural formula (I) in a ratio of 70% by mole relative to the total content of the units represented by the structural formulae (I), (II) and (III); the unit represented by the structural formula (II) in a ratio of 70% by mole relative to the total content of the units represented by the structural formulae (II) and (III); and the unit represented by structural formula (IV) in a ratio of 65% by mole relative to the total content of the units represented by the structural formulae (IV) and (V). Moreover, the content of the total units represented by the structural formulae (II) and (III) was 23% by mole relative to the total structural units, while the content of the total units represented by the structural formulae (IV) and (V) was 23% by mole relative to the total structural units. The melting point (Tm) of the liquid crystalline polyester resin (A-1) was 314° C. The melt viscosity measured using KOKA-type flow tester (orifice: 0.5φ×10 mm) at a temperature of 324° C. and at a shear rate of 1,000/s was 20 Pa·s.

Reference Example 2: Synthesis of the Liquid Crystalline Polyester Resin (A-2)

In a polymerization vessel, 994 g of p-hydroxybenzoic acid (7.20 mol), 181 g of 4,4'-dihydroxybiphenyl (0.97 mol), 161 g of terephthalic acid (0.97 mol), 159 g of a polyethylene terephthalate (0.83 mol) having an intrinsic viscosity of about 0.6 dl/g, and 1026 g of acetic anhydride (1.10 equivalents of the total phenolic hydroxyl groups) were placed, and the resulting mixture was allowed to react for two hours with stirring at 145° C. under nitrogen gas atmosphere and then heated to 335° C. for four hours. Then, the polymerization temperature was maintained at 335° C., and the pressure was increased to 0.1 MPa under a nitrogen pressurized atmosphere, and the mixture was heated for 20 minutes with stirring. Subsequently, the pressure was reduced to 1.0 mmHg (133 Pa) for 1.0 hour, and the reaction was allowed to continue for an additional 90 minutes, and the polycondensation was not completed until the torque reached 12 kg·cm. Then, the pressure within the reaction vessel was increased to 1.0 kg/cm$^2$ (0.1 MPa) to discharge the polymer in the form of a strand through a mouthpiece with one circular discharge port having a diameter of 10 mm, and the polymer pelletized with a cutter was obtained as the liquid crystalline polyester resin (A-2).

The liquid crystalline polyester resin was composed of the p-oxybenzoate unit in a ratio of 80.0% by mole, the 4,4'-dioxybiphenyl unit in a ratio of 10.8% by mole, the ethylenedioxy unit in a ratio of 9.2% by mole, and the terephthalate unit in a ratio of 20.0% by mole, and had a melting point (Tm) of 326° C. The melt viscosity measured using KOKA-type flow tester (orifice: 0.5φ×10 mm) at a temperature of 335° C. and at a shear rate of 1,000/s was 13 Pa·s.

Reference Example 3: Synthesis of the Liquid Crystalline Polyester Resin (A-3)

According to Japanese Unexamined Patent Application Publication No. Sho54-77691, 921 parts by weight of p-acetoxybenzoic acid and 435 parts by weight of 6-acetoxy-naphthoic acid were placed in a reaction vessel equipped with a mixing impeller and a distillation tube to perform polycondensation. The obtained liquid crystalline polyester resin (A-3) was composed of the structural unit derived from p-acetoxybenzoic acid in a ratio of 72% by mole and the structural unit derived from 6-acetoxy-naphthoic acid in a ratio of 28% by mole, and had a melting point (Tm) of 283° C. The melt viscosity measured using KOKA-type flow tester (orifice: 0.5φ×10 mm) at a temperature of 293° C. and at a shear rate of 1,000/s was 30 Pa·s.

(B) Spherical Silica

Spherical silica products used in the respective Examples and Comparative examples are shown below:

(B-1) "FEB75A" manufactured by Admatechs Co., Ltd. (manufacturing method: melting process; average particle diameter: 15 μm; sphericity: 0.94);

(B-2) "SO-C2" manufactured by Admatechs Co., Ltd. (manufacturing method: VMC method; average particle diameter: 0.5 μm; sphericity: 0.90);

(B-3) "HS-103" manufactured by Nippon Steel & Sumikin Materials Co., Ltd. (manufacturing method: thermal spraying method; average particle diameter: 100 μm; sphericity: 0.89);

(B-4) "FB-12D" manufactured by Denka Co., Ltd. (manufacturing method: melting process; average particle diameter: 10 μm; sphericity: 0.91);

(B-5) "MSR-SC3" manufactured by Tatsumori Ltd. (manufacturing method: melting process; average particle diameter: 53 μm; sphericity: 0.90);

(B-6) "FB-950" manufactured by Denka Co., Ltd. (manufacturing method: melting process; average particle diameter: 24 μm; sphericity: 0.97);

(B') Other silica; and (B'-1) "#250" manufactured by Marutou Co., Ltd. (manufacturing method: wet crushing method; average particle diameter: 22 μm; sphericity: 0.21).

(C) Plate-Like Fillers (C-1) "Mica A-21" manufactured by Yamaguchi Mica Co., Ltd. (number-average particle diameter: 22 μm); and (C-2) "Mica A-41S" manufactured by Yamaguchi Mica Co., Ltd. (number-average particle diameter: 47 μm).

(D) Fibrous Fillers (D-1) "Milled Fiber EPG70M-01N" manufactured by Nippon Electric Glass Co., Ltd. (number-average fiber length: 70 μm).

(D-2) "Milled Fiber EFH150-31" manufactured by Central Glass Co., Ltd. (number-average fiber length: 150 μm).

Examples 1 to 11

A vented co-rotating twin extruder having a screw diameter of 44 mm (TEX-44, manufactured by The Japan Steel Works, Ltd., having a void volume (V) of 1590 cm$^3$) was used. The liquid crystalline polyester resin (A) in the blending amount indicated in Table 1 was introduced from a hopper, while the spherical silica (B) in the blending amount indicated in Table 1, which is expressed relative to total 100 parts by weight of the liquid crystalline polyester resin composition, was introduced from an intermediate addition port. A melt-kneading process at the cylinder temperature set to the melting point of the liquid crystalline polyester resin (A)+10° C. was carried out to obtain pellets of the liquid crystalline polyester resin composition.

The obtained pellets were hot-air-dried and then used for the evaluation on the dust forming property, the Izod impact strength, and the deflection in bending according to the above-described methods. The results are presented in Table 1.

Comparative Examples 1 to 11

The same procedures as used for Examples 1 to 11 were taken for the evaluation on the dust forming property, the Izod impact strength, and the deflection in bending, except that the composition and the spherical silica were changed as indicated in Table 2. The results are shown in Table 2.

Moreover, Comparative Examples 1 and 2 clearly demonstrated that the effects on the dust forming property,

TABLE 1

| | (A) Liquid crystal polyester resin (100 parts by weight) | (B) Spherical silica (parts by weight) | | | | | | (B') Other silica (parts by weight) | (C) Plate-like filler (parts by weight) (number average particle diameter (μm)) | | (D) Fibrous filler (parts by weight) (number average fiber length (μm)) | | Low Dust Forming Property Tape Delamination Test Haze value % | Mechanical Strength Izod Impact Strength J/m | Toughness Bending Deflection mm |
|---|---|---|---|---|---|---|---|---|---|---|---|---|---|---|---|
| | | B-1 | B-2 | B-3 | B-4 | B-5 | B-6 | B'-1 | C-1 | C-2 | D-1 | D-2 | | | |
| Example 1 | A-1 | 30.0 | — | — | — | — | — | — | — | — | — | — | 3 | 220 | 5.5 |
| Example 2 | A-1 | 20.0 | — | — | — | — | — | — | — | — | — | — | 5 | 210 | 5.2 |
| Example 3 | A-1 | 40.0 | — | — | — | — | — | — | — | — | — | — | 8 | 198 | 5.0 |
| Example 4 | A-2 | 30.0 | — | — | — | — | — | — | — | — | — | — | 16 | 174 | 4.2 |
| Example 5 | A-3 | 30.0 | — | — | — | — | — | — | — | — | — | — | 18 | 172 | 4.1 |
| Example 6 | A-1 | 20.0 | — | — | — | — | — | — | — | — | 5.0 (64) | — | 7 | 230 | 5.2 |
| Example 7 | A-1 | 20.0 | — | — | — | — | — | — | — | — | — | 5.0 (150) | 19 | 256 | 4.9 |
| Example 8 | A-1 | 20.0 | — | — | — | — | — | — | 5.0 (24) | — | — | — | 4 | 198 | 5.0 |
| Example 9 | A-1 | 20.0 | — | — | — | — | — | — | — | 5.0 (40) | — | — | 9 | 187 | 4.3 |
| Example 10 | A-1 | 20.0 | — | — | — | — | — | — | 5.0 (24) | — | 5.0 (65) | — | 5 | 215 | 5.2 |
| Example 11 | A-1 | — | — | — | — | — | 30.0 | — | — | — | — | — | 7 | 190 | 4.4 |

TABLE 2

| | (A) Liquid crystal polyester resin (100 parts by weight) | (B) Spherical silica (parts by weight) | | | | | | (B') Other silica (parts by weight) | (C) Plate-like filler (parts by weight) (number average particle diameter (μm)) | | (D) Fibrous filler (parts by weight) (number average fiber length (μm)) | | Low Dust Forming Property Tape Delamination Test Haze value % | Mechanical Strength Izod Impact Strength J/m | Toughness Bending Deflection mm |
|---|---|---|---|---|---|---|---|---|---|---|---|---|---|---|---|
| | | B-1 | B-2 | B-3 | B-4 | B-5 | B-6 | B'-1 | C-1 | C-2 | D-1 | D-2 | | | |
| Comparative Example 1 | A-1 | 5.0 | — | — | — | — | — | — | — | — | — | — | 26 | 115 | 2.8 |
| Comparative Example 2 | A-1 | 70.0 | — | — | — | — | — | — | — | — | — | — | 33 | 85 | 1.9 |
| Comparative Example 3 | A-1 | — | 20.0 | — | — | — | — | — | — | — | — | — | 38 | 120 | 3.0 |
| Comparative Example 4 | A-1 | — | — | 20.0 | — | — | — | — | — | — | — | — | 43 | 110 | 2.5 |
| Comparative Example 5 | A-1 | — | 15.0 | — | — | — | — | — | — | — | 5.0 (64) | — | 46 | 125 | 2.5 |
| Comparative Example 6 | A-1 | — | 20.0 | — | — | — | — | — | — | — | 5.0 (64) | — | 37 | 113 | 2.1 |
| Comparative Example 7 | A-1 | — | 15.0 | — | — | — | — | — | 5.0 (24) | — | — | — | 51 | 100 | 2.0 |
| Comparative Example 8 | A-1 | — | — | 20.0 | — | — | — | — | 5.0 (24) | — | — | — | 36 | 92 | 1.8 |
| Comparative Example 9 | A-1 | — | — | — | — | — | — | 30.0 | — | — | — | — | 67 | 135 | 2.4 |
| Comparative Example 10 | A-1 | — | — | — | 30.0 | — | — | — | — | — | — | — | 26 | 155 | 3.4 |
| Comparative Example 11 | A-1 | — | — | — | — | 30.0 | — | — | — | — | — | — | 28 | 165 | 3.8 |

Examples 1 to 5 clearly demonstrated that blending a particular amount of spherical silica particles having a particular particle diameter into the liquid crystalline polyester resins significantly improves the dust forming property as compared to Comparative Examples 3 and 4, into which previously known silica microparticles and silica particles with a large diameter have been blended, respectively.

impact strength and toughness are not achieved when the amount of blended spherical silica particles is out of our range.

Moreover, Examples 6 to 10 demonstrated that further blending of plate-like fillers improves the low dust forming property, as well as that further blending of fibrous fillers improves the impact strength.

INDUSTRIAL APPLICABILITY

A liquid crystalline resin composition for use in camera modules exhibits excellent low dust forming property, toughness, impact strength and high toughness, and a molded product made therefrom for use in the camera modules can be obtained.

The invention claimed is:

1. A liquid crystalline polyester resin composition for use in camera modules, the resin composition comprising 20 to 45 parts by weight of spherical silica particles (B) having an average particle diameter of 15 μm or more and less than 30 μm in 100 parts by weight of a liquid crystalline polyester resin (A), wherein the liquid crystalline polyester resin (A) is composed of structural units (I), (II), (III), (IV) and (V), and wherein the content of structural unit (I) is from 65 to 80% by mole relative to the total content of structural units (I), (II) and (III), and the content of structural unit (II) is from 55 to 85% by mole relative to the total content of structural units (II) and (III), and the content of structural unit (IV) is from 50 to 95% by mole relative to the total content of structural units (IV) and (V)

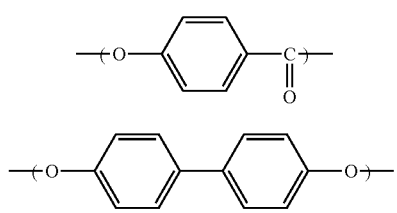

(I)

(II)

-continued

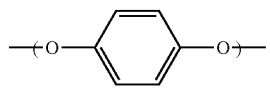

(III)

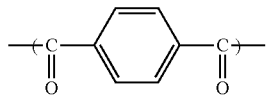

(IV)

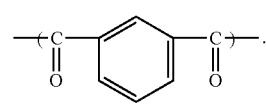

(V)

2. The liquid crystalline polyester resin composition according to claim 1, further comprising a plate-like filler (C) having an average particle diameter of 10 to 50 μm and/or a fibrous filler (D) having an average fiber length of 30 to 300 μm.

3. The liquid crystalline polyester resin composition according to claim 1, wherein the spherical silica particles (B) is a spherical silica particle having a sphericity of not less than 0.85.

4. A molded product for use in camera modules comprising the resin composition according to claim 1.

5. A molded product for use in camera modules comprising the resin composition according to claim 2.

6. A molded product for use in camera modules comprising the resin composition according to claim 3.

* * * * *